US010893664B2

(12) United States Patent
Slinkard

(10) Patent No.: US 10,893,664 B2
(45) Date of Patent: Jan. 19, 2021

(54) ANIMAL DRINKER

(71) Applicant: Manna Pro Products, LLC, Chesterfield, MO (US)

(72) Inventor: Paul H. Slinkard, Nolensville, TN (US)

(73) Assignee: Manna Pro Products, LLC, Chesterfield, MO (US)

( * ) Notice: Subject to any disclaimer, the term of this patent is extended or adjusted under 35 U.S.C. 154(b) by 233 days.

(21) Appl. No.: 16/059,402

(22) Filed: Aug. 9, 2018

(65) Prior Publication Data
US 2020/0045940 A1 Feb. 13, 2020

(51) Int. Cl.
| A01K 39/00 | (2006.01) |
| A01K 39/024 | (2006.01) |
| A01K 7/04 | (2006.01) |
| A01K 7/00 | (2006.01) |

(52) U.S. Cl.
CPC .............. *A01K 39/024* (2013.01); *A01K 7/04* (2013.01); *A01K 7/005* (2013.01)

(58) Field of Classification Search
CPC ...... A01K 39/00; A01K 39/02; A01K 39/024; A01K 7/00; A01K 7/02; A01K 7/024
USPC ................ 119/51.5, 72, 74, 77–80; 137/429, 137/395–398, 433; 222/67, 68, 64
See application file for complete search history.

(56) References Cited

U.S. PATENT DOCUMENTS

| 1,692,131 | A | * | 11/1928 | Martin ................. | E21B 43/121 |
| | | | | | 417/116 |
| 2,844,147 | A | * | 7/1958 | Beachman ............. | A61M 5/40 |
| | | | | | 604/127 |
| 3,324,834 | A | * | 6/1967 | McKinstry ............ | A01K 7/027 |
| | | | | | 119/78 |
| 3,450,103 | A | * | 6/1969 | Davis ................... | A01K 39/024 |
| | | | | | 119/80 |
| 3,495,617 | A | | 2/1970 | Lothar | |
| 3,667,493 | A | * | 6/1972 | Lindstrom ............. | F16K 31/24 |
| | | | | | 137/87.02 |
| 4,180,015 | A | * | 12/1979 | Dawson, Jr. ......... | A01K 39/024 |
| | | | | | 119/78 |
| 4,196,699 | A | * | 4/1980 | Leeming .............. | A01K 39/022 |
| | | | | | 119/81 |
| 4,659,463 | A | * | 4/1987 | Chandler ............... | C02F 1/004 |
| | | | | | 210/202 |
| 7,946,249 | B2 | * | 5/2011 | Colvin ................. | A01K 39/024 |
| | | | | | 119/74 |
| 8,826,859 | B1 | | 9/2014 | Slinkard | |
| 2006/0027179 | A1 | | 2/2006 | Welbourne | |
| 2010/0162961 | A1 | | 7/2010 | Hove et al. | |
| 2010/0224132 | A1 | | 9/2010 | Gauker et al. | |

* cited by examiner

*Primary Examiner* — Richard T Price, Jr.
(74) *Attorney, Agent, or Firm* — Armstrong Teasdale LLP

(57) ABSTRACT

An animal drinker includes a base tray that is defined by an exterior drinking trough connected to an interior fluid reservoir by a passageway. The trough and the interior fluid reservoir are maintained at a consistent fluid level. An upper reservoir stores fluid above the interior reservoir and is in fluid communication therewith by an outlet positioned at the bottom. A buoyant float pan is positioned in the interior fluid reservoir of the base tray. A float stop is positioned between the float pan and the outlet of the upper reservoir to stop the flow of fluid from the upper reservoir to the interior fluid reservoir at a predetermined level.

20 Claims, 4 Drawing Sheets

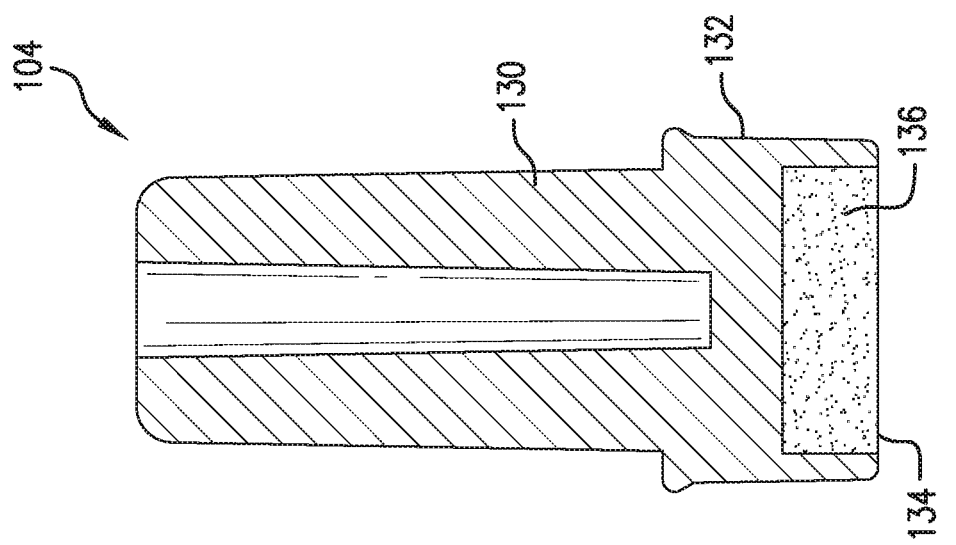
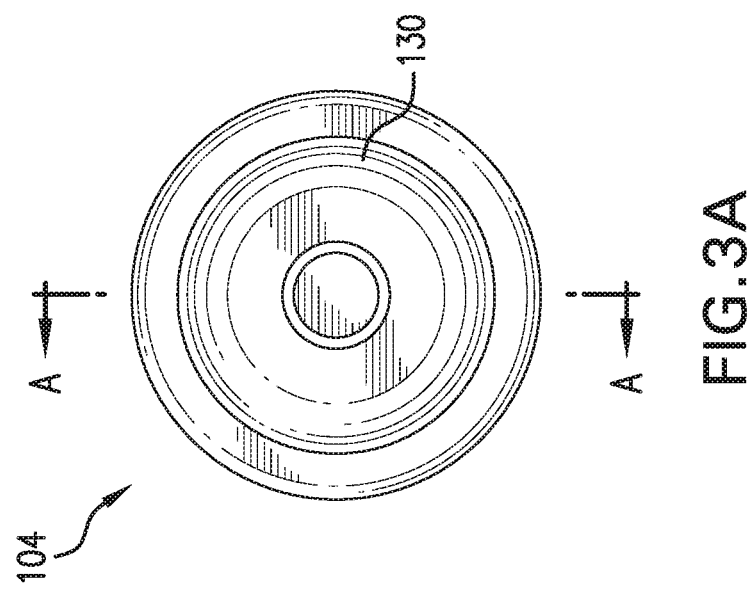
FIG.3B
FIG.3A

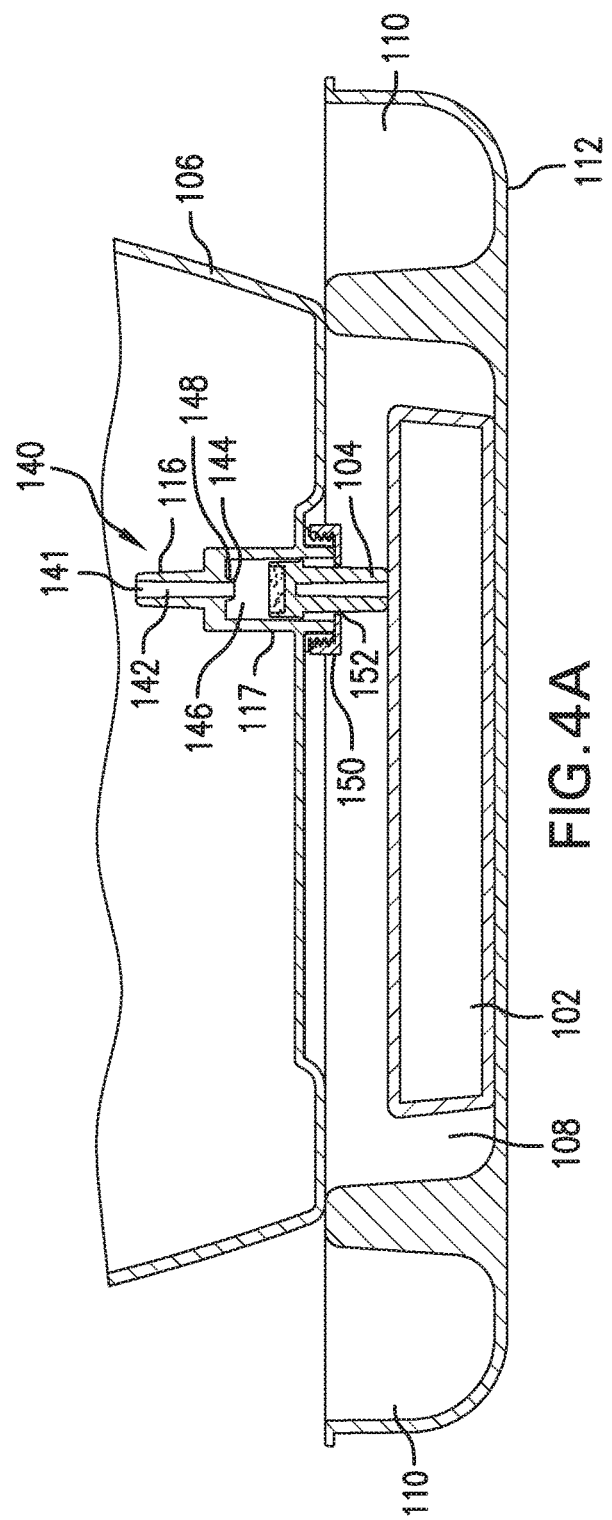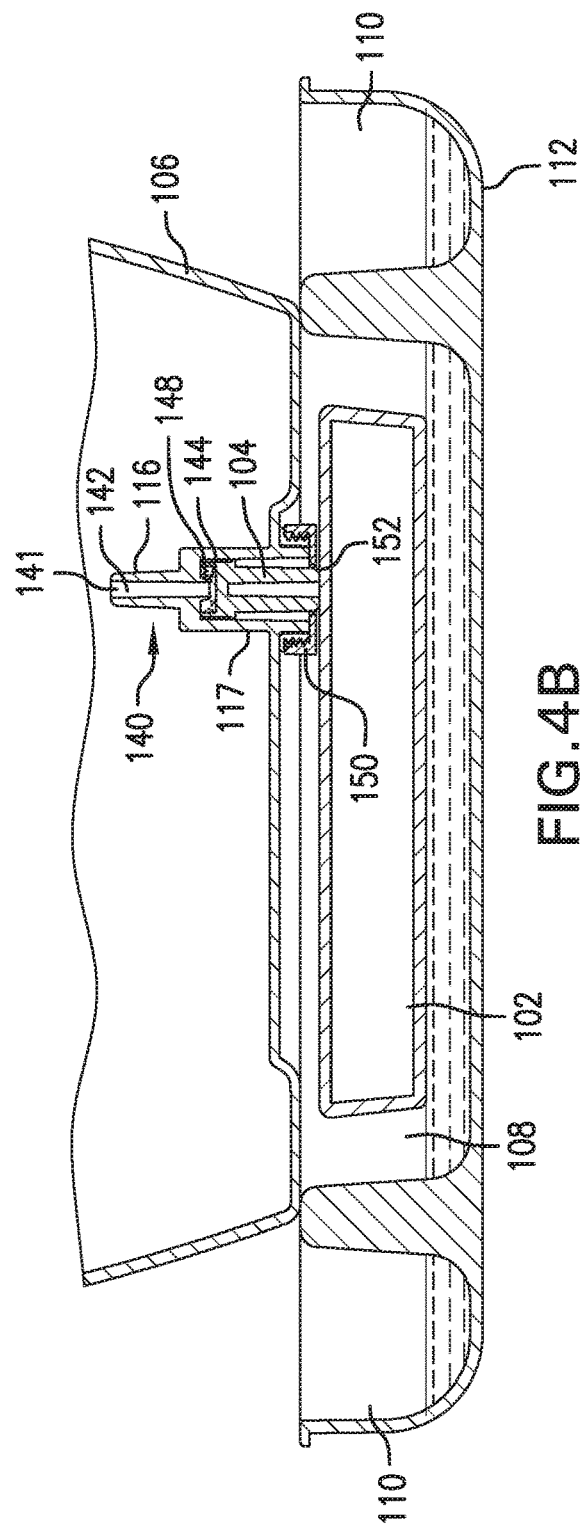

ANIMAL DRINKER

BACKGROUND

The present disclosure relates generally to supplying water to poultry or like animals, and more particularly to an intermittent and automatic provision of fresh water to poultry.

Poultry drinking troughs are well known. Such devices may include a trough which is automatically supplied with water as the water level in the trough drops below a predetermined level. The problem with such automated devices is that they are overly complicated with several moving parts and the valve mechanisms are prone to sticking which can cause water to either cease flowing into the trough or overflow the trough. Either case is undesirable. Therefore, it would be advantageous to provide an intermittent and automatic drinker that is easy to assemble and reliable.

SUMMARY OF THE INVENTION

An animal drinker includes a base tray that is defined by an exterior drinking trough connected to an interior fluid reservoir by a passageway. The trough and the interior fluid reservoir are maintained at a consistent fluid level. An upper reservoir stores fluid above the interior reservoir and is in fluid communication therewith by an outlet positioned at the bottom. A buoyant float pan is positioned in the interior fluid reservoir of the base tray. A float stop is positioned between the float pan and the outlet of the upper reservoir to stop the flow of fluid from the upper reservoir to the interior fluid reservoir at a predetermined level.

BRIEF DESCRIPTION OF THE DRAWINGS

FIG. 3A is a top view of a float stop from the animal drinker of FIG. 1.

FIG. 3B is a cross-sectional view of the float stop of FIG. 1.

FIG. 4A is a cross-sectional view of the animal drinker of FIG. 1 with the outlet in the open position.

FIG. 4B is a cross-sectional view of the animal drinker of FIG. 1 with the outlet in the closed position.

DESCRIPTION OF THE ILLUSTRATED EMBODIMENTS

Figure 1:
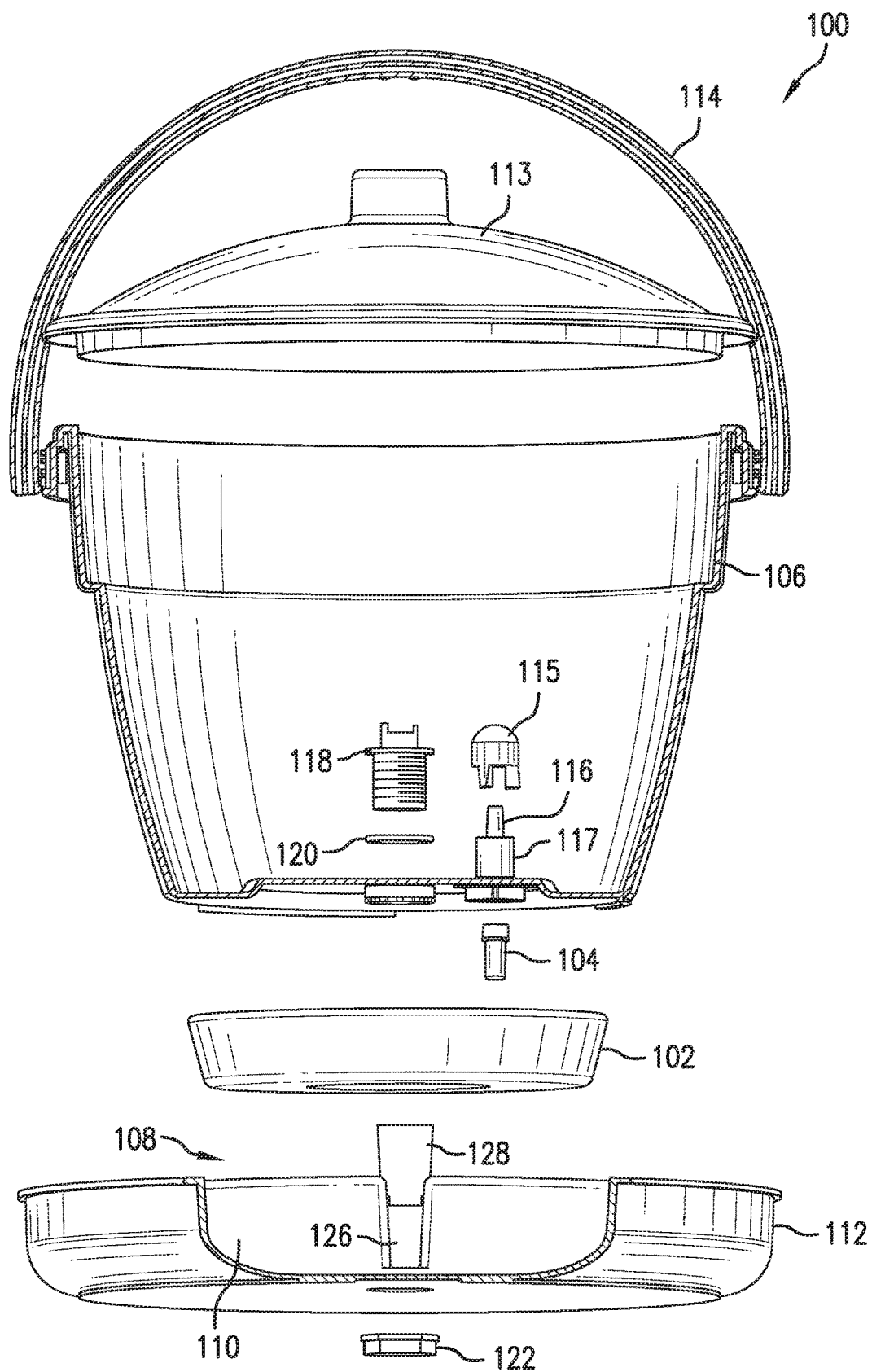
FIG. 1 is an exploded view of an exemplary animal drinker according to the illustrated embodiment.
Figure 2:
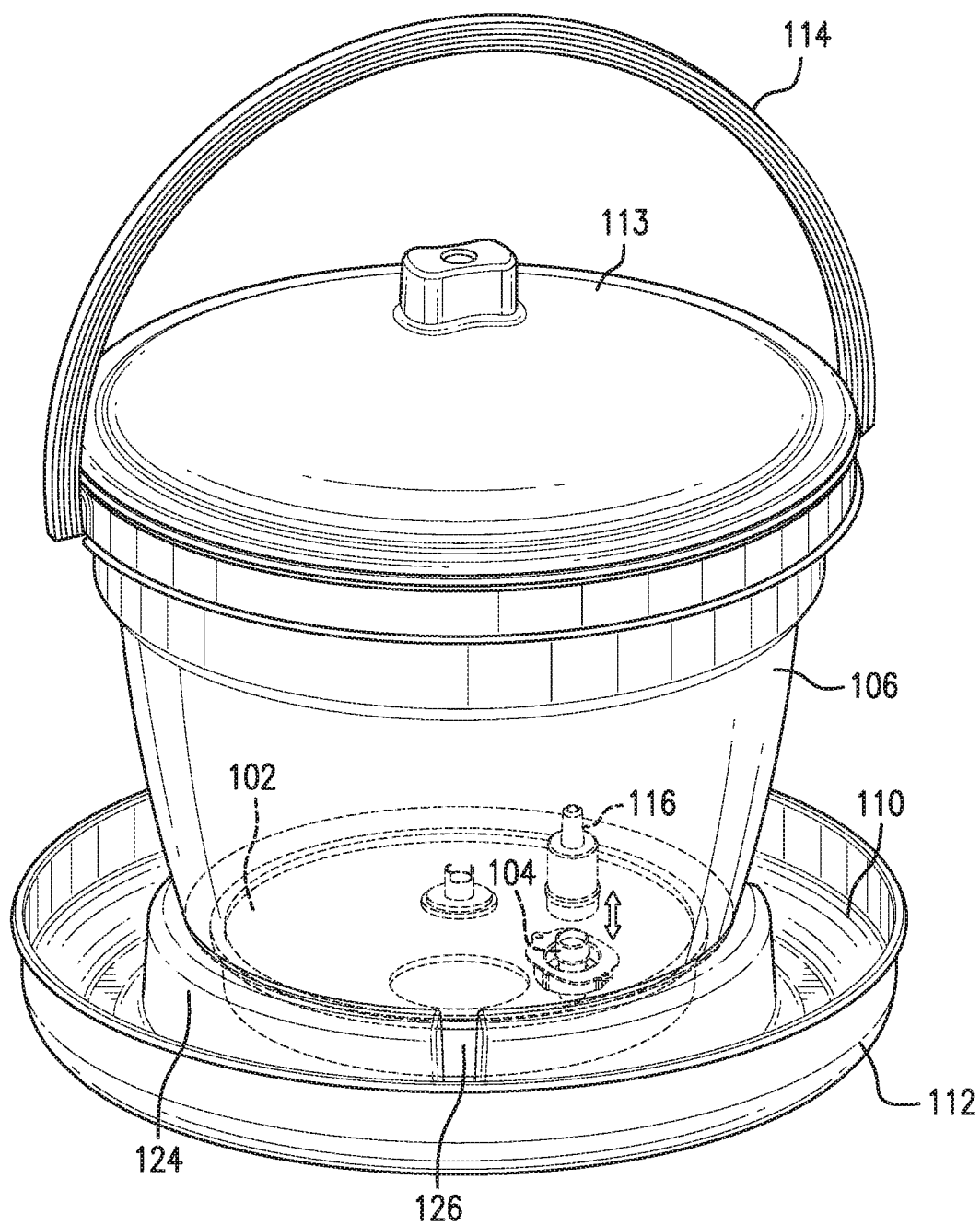
FIG. 2 is the animal drinker of FIG. 1.

The present disclosure is an animal drinker 100 as shown in FIGS. 1-2. The animal drinker 100 contains a float pan 102 and a float stop 104, which together regulate the flow of fluid from an upper reservoir 106 to a lower reservoir 108 (shown more clearly in FIGS. 4A and 4B), and into a trough 110. Float pan 102 and float stop 104 either prevent or allow the flow of fluid depending upon the volume of fluid in trough 110.

Referring to FIG. 1, an exploded view of animal drinker 100 is shown. Animal drinker 100 includes upper reservoir 106 for storing fluid, a base tray 112, float pan 102 and float stop 104. Upper reservoir 106 is attached to base tray 112 and is in fluid communication with base tray 112. Float pan 102 and float stop 104 is positioned between base tray 112 and upper reservoir 106. When fluid flows through upper reservoir 106 and into base tray 112, float pan 102 will rise until float stop 104 prevents the fluid from flowing through upper reservoir 106 and into base tray 112. By having float pan 102 and float stop 104 regulate the flow of fluid, animal drinker 100 requires less maintenance, reduced spillage, and self-regulation of the fluid.

Upper reservoir 106 is covered by a lid 113 and is moveable by a handle 114. Upper reservoir 106 has a sufficient volume to hold enough fluid to fill base tray 112 and, as a result, allow float pan 102 and float stop 104 to rise. In one embodiment, upper reservoir 106 defines the shape of a bucket or a container; however, it should be noted that upper reservoir 106 may define any other shape.

Upper reservoir 106 is removable from base tray 112. In a preferred embodiment, upper reservoir 106 is threadably attached to base tray 112 by a screw 118, a washer 120, and a nut 122. It should be noted that alternative methods known in the art for attaching upper reservoir 106 to base tray 112 are also suitable. For example, upper reservoir 106 may be fixedly attached to base tray 112 without the use of threads.

The bottom end of upper reservoir 106 is partially closed off, and has a connecting passageway or outlet 116 for fluid to exit upper reservoir 106 into base tray 112. In a preferred embodiment, there is one outlet 116, but alternative embodiments may contain two or more outlets 116. It should be noted that the size of outlet 116 may be adjusted according to the viscosity of the fluid and the desired flow rate of the fluid from upper reservoir 106 to base tray 112. The outlet 116 can be plugged with a plug 115 at the point of sale, which can be disposed after use. The bottom portion of outlet 116 is defined by a chamber 117 sized to receive float stop 104. This interaction will be more thoroughly discussed below.

FIG. 2 shows animal drinker 100, as it is assembled. Upper reservoir 106 is positioned atop base tray 112 on a side-wall 124 partially circumscribing the inside of base tray 112 defining interior, lower reservoir 108. Referring briefly to FIGS. 4A and 4B, Float pan 102 and float stop 104 are positioned in lower reservoir 108 and move up and down with the fluid level in lower reservoir 108. A passageway 126 provides a channel for fluid to move from lower reservoir 108 to trough 110. It is contemplated that lower reservoir 108 and trough 110 can be any depth. Furthermore, passageway 126 can be temporarily or partially blocked with a stop 128 (shown in FIG. 1) to limit the amount of fluid that flows into trough 110.

FIGS. 3A and 3B show float stop 104. Float stop 104 comprises of an extending member 130 and a sealing end 132. The function of extending member 130 will be better understood in the context of outlet assembly 140, show in FIGS. 4A-4B. Sealing end 132 comprises of a sealing surface 134 that is configured for sealing an outlet in outlet assembly 140 to stop the flow of fluid into lower reservoir 108. In one embodiment, sealing end 132 of float stop 104 can be formed as a disc in a single piece with extending member 130 and with a diameter larger than the diameter of extending member 130 to prevent float stop from escaping outlet assembly 140. Sealing end 132 can be formed with an indentation for receiving a foam pad 136 that comprises of a top surface that is sealing surface 134 of float stop 104. In this embodiment, sealing surface 134 of float stop 104 is deformable for a purpose that will become more clear in the context of FIGS. 4A-4B.

FIGS. 4A-4B show a cross-sectional view of the animal drinker with the outlet in the open position and the closed position, respectively. Outlet assembly 140 is provided at or near the bottom of upper reservoir 106. Outlet assembly 140 comprises of an inlet 141 at the top of outlet assembly 140 that directs fluid from upper reservoir 106 into a channel 142 and out an outlet 144 into a cavity 146. In one embodiment, outlet 144 can be distended as a protuberance 148 to cooperate with foam pad 136 on float stop 104. In this embodiment, sealing surface 134 of foam pad 136 of float stop 104 deforms around protuberance 148 of outlet assembly 140 to seal outlet 144 to increase sealability of outlet 144 by float stop 104.

Outlet assembly 140 can extend through the bottom of upper reservoir 106 with a threaded portion to receive a retaining ring 150. This allows access to cavity 146 so that float stop 103 can be inserted with sealing end 132 of float stop 104 inserted upright into cavity 146. Cavity 146 of outlet assembly 140 has a diameter slightly larger than a diameter of sealing end 132 of float stop 104, such that sealing end 132 of float stop 104 fits loosely within cavity 146 of outlet assembly 140 so that fluid can flow around sealing end 132 of float stop 104 into lower reservoir 108.

Retaining ring 150 can comprise a through hole 152 for extending member 130 of float stop 104 to at least partially extend out. This allows the buoyant float pan 102 to push float stop 104 upward as a fluid level in lower reservoir 108 of the base tray 112 rises. Since extending member 130 partially extends out of through hole 152 in retaining ring 150, float stop 104 is maintained in a generally upright position within cavity 146 of outlet assembly 140.

Float stop 104 can be made from any type of material provided it keeps float stop buoyant, such materials, include plastic, cork, and wood. Float stop 104 can be separate from float pan 102, or integrally combined with float pan 102.

Referring to FIG. 4A, in operation, a user opens lid 113 and fills upper reservoir 106 with fluid. As upper reservoir 106 is being filled, fluid begins to flow through outlet assembly 140 and into lower reservoir 108 of base tray 112 through passageway 126 and into trough 110. As lower reservoir 108 begins to fill, float pan 102 gradually begins to rise moving float stop 104 upward thus forcing float stop 104 into sealing engagement with outlet 144 of outlet assembly 140.

When outlet 144 of outlet assembly 140 is completely blocked by float stop 104, the fluid is prevented from moving from upper reservoir 106 through outlet 144 and around and out float stop 104. As a result, leakage or overflow of the fluid is prevented. In addition, the fluid inside upper reservoir 106 is preserved inside and used when necessary to fill trough 110 of base tray 112.

Referring to FIG. 4B, as animals begin consuming fluid in trough 110, the fluid level begins to lower. Float pan 102 lowers with the fluid level removing float stop 104 from engagement with outlet 144 to permit fluid in upper reservoir 106 to flow there through into lower reservoir 108. Animal drinker 100 permits easy and convenient refilling of trough 110. When upper reservoir 106 is near empty, lid 113 can be removed so that upper reservoir 106 can be refilled without the need to disassemble animal drinker 100.

To those skilled in the art to which this disclosure relates, many changes in construction and widely differing embodiments and applications will suggest themselves without departing from the spirit and scope of the disclosure. The disclosures and the descriptions herein are purely illustrative and are not intended to be in any sense limiting. Various aspects of the different embodiments can be combined in different combinations to create new embodiments within the scope of the invention.

What is claimed is:

1. An animal drinker, comprising:
   a base tray defined by an exterior drinking trough and an interior fluid reservoir and including a connecting passageway for maintaining a fluid at a fluid level that is a same in each of the exterior drinking trough and the interior fluid reservoir;
   an upper reservoir for storing fluid positioned above the interior fluid reservoir;
   an outlet assembly positioned at a bottom of the upper reservoir comprising an inlet at a top of the outlet assembly that directs fluid from the upper reservoir into a channel and out an outlet into a cavity; and
   a buoyant float pan positioned in the interior fluid reservoir of the base tray; and
   a float stop positioned at least partially in the cavity of the outlet assembly and comprising a sealing surface that presses against the outlet of the outlet assembly to prevent fluid from flowing into the lower reservoir, wherein the float stop comprises an extending member having a first diameter and a sealing end integrally formed from the extending member, the sealing end having a second diameter larger than the first diameter.

2. The drinker of claim 1, wherein the upper reservoir further comprises a retaining ring that fits on an underside of the upper reservoir to hold the float stop at least partially in the cavity of the outlet assembly.

3. The drinker of claim 2, wherein the retaining ring further comprises a through hole, and wherein the extending member at least partially extends out of the through hole of the retaining ring so that the buoyant float pan can push the float stop upward as a fluid level in the interior fluid reservoir of the base tray rises.

4. The drinker of claim 3, wherein the outlet of the outlet assembly is provided on a protuberance that extends into the cavity to increase sealability of the outlet by the float stop.

5. The drinker of claim 4, wherein float stop further comprises a foam pad having a top surface that is the sealing surface of the float stop, wherein the sealing surface of the float stop deforms around the protuberance of the outlet assembly to seal the outlet.

6. The drinker of claim 1, wherein the cavity of the outlet assembly has a diameter slightly larger than the second diameter of the sealing end of the float stop, such that the float stop fits loosely within the cavity of the outlet assembly so that fluid can flow around the float stop into the interior fluid reservoir.

7. The drinker of claim 6, wherein the float stop is maintained in a generally upright position within the cavity.

8. The drinker of claim 1, wherein the extending member comprises a cavity extending therethrough.

9. The drinker of claim 8, wherein the cavity terminates within the sealing end.

10. The drinker of claim 1, wherein the sealing end defines a pocket configured to receive a sealing member.

11. An animal drinker, comprising:
    a base tray defined by an exterior drinking trough and an interior fluid reservoir and including a connecting passageway for maintaining a fluid at a fluid level that is a same in each of the exterior drinking trough and the interior fluid reservoir;
    a container for storing fluid positioned above the interior fluid reservoir;
    an outlet assembly positioned at a bottom of the container comprising an inlet at the top of the outlet assembly that directs fluid from the container into a channel and out an outlet into a cavity
    a float pan positioned in the interior fluid reservoir of the base tray that moves with the fluid level; and a float stop positioned at least partially in the cavity of the outlet assembly and comprising a sealing surface that presses against the outlet of the outlet assembly to prevent fluid from flowing into the lower reservoir, wherein the float stop comprises an extending member having a first diameter and a sealing end integrally formed from the extending member, the sealing end having a second diameter larger than the first diameter.

12. The animal drinker of claim 11, wherein the container further comprises a retaining ring that fits on the underside of the container to hold the float stop at least partially in the cavity of the outlet assembly.

13. The animal drinker of claim 12, wherein the retaining ring further comprises a through hole, and wherein the float stop further comprises of an extending member that at least partially extends out of the through hole of the retaining ring so that the buoyant float pan can push the float stop upward as a fluid level in the interior fluid reservoir of the base tray rises.

14. The drinker of claim 13, wherein the outlet of the outlet assembly is provided on a protuberance that extends into the cavity to increase sealability of the outlet by the float stop.

15. The animal drinker of claim 14, wherein float stop further comprises a foam pad having a top surface that is the sealing surface of the float stop, wherein the sealing surface of the float stop deforms around the protuberance of the outlet assembly to seal the outlet.

16. The drinker of claim 11, wherein the cavity of the outlet assembly has a diameter slightly larger than the second diameter of the sealing end of the float stop, such that the float stop fits loosely within the cavity of the outlet assembly so that fluid can flow around the float stop into the interior fluid reservoir.

17. The drinker of claim 16, wherein the float stop is maintained in a generally upright position within the cavity.

18. The drinker of claim 11, wherein the extending member comprises a cavity extending therethrough.

19. The drinker of claim 18, wherein the cavity terminates within the sealing end.

20. The drinker of claim 11, wherein the sealing end defines a pocket configured to receive a sealing member.

* * * * *